United States Patent
Hagiya

(10) Patent No.: US 8,905,440 B2
(45) Date of Patent: Dec. 9, 2014

(54) GROOVED-ENDED RESILIENT EXPANSION JOINT AND METHOD OF RESILIENTLY JOINING TOGETHER A PAIR OF GROOVED-ENDED PIPES

(76) Inventor: Howard Hagiya, Ibaragi (JP)

( * ) Notice: Subject to any disclaimer, the term of this patent is extended or adjusted under 35 U.S.C. 154(b) by 551 days.

(21) Appl. No.: 12/955,893

(22) Filed: Nov. 29, 2010

(65) Prior Publication Data

US 2011/0146049 A1 Jun. 23, 2011

Related U.S. Application Data

(60) Provisional application No. 61/265,321, filed on Nov. 30, 2009.

(51) Int. Cl.
F16L 17/04 (2006.01)
F16L 51/02 (2006.01)
F16L 27/108 (2006.01)
F16L 55/033 (2006.01)

(52) U.S. Cl.
CPC ............ *F16L 51/024* (2013.01); *F16L 27/108* (2013.01); *F16L 55/0337* (2013.01)
USPC ........ 285/112; 285/109; 285/293.1; 285/367; 29/463; 29/525.02

(58) Field of Classification Search
CPC ....... F16L 21/065; F16L 17/04; F16B 41/002
USPC ................ 29/446, 525.01, 525.11, 505, 463; 285/226, 112, 109, 293.1
See application file for complete search history.

(56) References Cited

U.S. PATENT DOCUMENTS

| | | | | |
|---|---|---|---|---|
| 2,013,547 A | * | 9/1935 | Badger et al. | 285/301 |
| 2,083,966 A | * | 6/1937 | Stitzer | 138/89 |
| 2,232,657 A | * | 2/1941 | Davis | 285/226 |
| 3,107,931 A | * | 10/1963 | Killian | 285/108 |
| 3,139,115 A | * | 6/1964 | Bawcon et al. | 138/121 |
| 3,666,296 A | * | 5/1972 | Fischetti | 285/45 |
| 3,861,721 A | * | 1/1975 | Berghofer | 285/236 |
| 4,072,329 A | * | 2/1978 | Mutchler | 285/187 |
| 4,101,150 A | * | 7/1978 | Thawley et al. | 285/226 |
| 4,293,152 A | * | 10/1981 | Berghofer | 285/229 |
| 4,524,996 A | * | 6/1985 | Hunt | 285/55 |
| 4,526,409 A | * | 7/1985 | Schaefer | 285/114 |
| 4,765,660 A | * | 8/1988 | Maier | 285/229 |
| 5,048,249 A | * | 9/1991 | Shreiner et al. | 52/396.07 |
| 5,174,613 A | * | 12/1992 | Joug | 285/229 |
| 6,186,560 B1 | * | 2/2001 | Gill | 285/305 |
| 6,908,394 B2 | * | 6/2005 | Amborn | 464/167 |
| 7,520,539 B2 | * | 4/2009 | Ignaczak et al. | 285/367 |
| 7,921,536 B2 | * | 4/2011 | Dole | 29/463 |
| 2009/0021006 A1 | * | 1/2009 | Hobbs | 285/276 |

* cited by examiner

*Primary Examiner* — Minh Trinh
(74) *Attorney, Agent, or Firm* — Kacvinsky Daisak Bluni PLLC

(57) ABSTRACT

A grooved-ended resilient expansion joint is disclosed. The expansion joint has a resilient expansion member with a central resilient portion and two resilient axially disposed cylindrical ends. Each cylindrical end has a radially outwardly raised distal cylindrical gasket portion with at least one inside shoulder having an inner diameter sized substantially the same as an outer diameter of a pipe to be joined. Each cylindrical end also has a neck portion between the central portion and the gasket portion that is sized to receive a grooved-ended pipe nipple.

8 Claims, 5 Drawing Sheets

GROOVED-ENDED RESILIENT EXPANSION JOINT AND METHOD OF RESILIENTLY JOINING TOGETHER A PAIR OF GROOVED-ENDED PIPES

This application claims priority to U.S. Provisional Application 61/265,321 filed Nov. 30, 2009.

TECHNICAL FIELD

The invention relates to pipe joints; more particularly, it relates to rubber expansion joints to enable a direct connection with coaxial grooved-end pipes.

BACKGROUND

Rubber expansion joints are widely used in general service piping systems including water supply, fire protection, chill water and drain for the purpose of absorbing linear movements generated by thermal expansion and/or contraction, lateral sways caused by earthquakes, vibration and noises in the pump room, and the like.

A rubber expansion joint may be formed of a rubber bellow(s), as shown in FIGS. 1 and 2, coupled with a pair of steel (or iron) flanges for connection to existing piping systems, because rubber bellows cannot otherwise presently be directly connected with pipes to create a non-leaking union. Rubber is elastic but not very strong against thrust load and inner pressures and is therefore generally reinforced with layers made of nylon fabrics or steel braiding.

Such a flanged rubber expansion joint requires a counter flange at each end to be mounted on the pipe end and requires a number of bolts and nuts for connection (see FIG. 3). In the flanged rubber expansion joint, the flanges placed outside of the bellow(s) serve not only as connectors with counter flanges but also as retainers of the bellow(s) from slippage. Both ends of the bellow(s) are sandwiched in between the flanges and secured by tightening of the bolts and nuts.

However, installation of a flange on a pipe end requires welding with high temperature flames or arcs. And as the use of a flame or arc is believed to be an accidental fire hazard, welding at job sites is nowadays entirely prohibited or strictly restricted. The present alternative for installing a flanged rubber expansion joint in a grooved-ended piping system is to prepare a couple of special adapters like the ones shown in FIG. 4, but that requires extra pieces and extra work and pushes up the cost.

In recent years, grooved-ended piping systems have come into wide use and acceptance as they provide high work efficiency without the use of flames or arcs at job site. What has not been developed is a grooved-end rubber expansion joint which enables a direct connection with coaxial grooved-end pipes, without the use of flanges.

DISCLOSURE

The disclosed rubber expansion joint is a grooved-end rubber expansion joint which enables a direct connection with coaxial grooved-end pipes, without the use of flanges. The joint enables a direct connection with coaxial grooved-end pipes, employing a couple of mechanical couplings to raise work efficiency and secure safety. Both ends of the bellow(s) are formed to fit and seal the outer surface of each grooved pipe end. Optionally the joint is furnished with a couple of grooved pipe nipples to engage with the mechanical couplings.

Desirably, the exterior of each end of the bellow(s) is formed into a trapezoid shape to fit the gasket pocket of the mechanical coupling as shown in FIG. 5. Alternatively the interior of each end of the bellow(s) is formed into a C shape at one side and a straight shape at the other side. The C-shaped end provides a high sealing capability against elevated inner pressures and the straight shaped end serves as a retainer to prevent the bellow(s) from slipping out. Optionally the C-shaped portion of the bellow(s) is formed without layers of nylon fabrics or steel braiding so as to secure high sealing capability. A further option is to set a grooved-end pipe nipple around the bellow(s) to sit beneath a chin of the trapezoid (see FIG. 5). The steel nipple advantageously has the same pipe OD as the pipe to be connected with, and is grooved to AWWA C606 standards, or the like.

The bellow(s) can be single sphere, double or triple sphere depending on the desired movement to absorb. The number of layers of nylon fabrics or steel braiding depends in a well-known manner on the desired working pressure.

The disclosed rubber expansion joint provides a leak-tight, pressure containing union between coaxial grooved-end pipes with the aid of mechanical couplings. There is no chance for the bellow(s) to slip out of the couplings.

A grooved-ended resilient expansion joint is disclosed. The expansion joint has a resilient expansion member with a central resilient portion and two resilient axially disposed cylindrical ends. Each cylindrical end has a radially outwardly raised distal cylindrical gasket portion with at least one inside shoulder having an inner diameter sized substantially the same as an outer diameter of a pipe to be joined. Each cylindrical end also has a neck portion between the central portion and the gasket portion that is sized to receive a grooved-ended pipe nipple.

A grooved pipe nipple that has the same outer diameter as the pipe to be joined is set around the neck portion. The grooved pipe nipple is grooved to mate with a selected mechanical pipe coupling connector. A mechanical pipe coupling connector is also provided that has axially inward projecting lands that mate with the end groove in the pipe to be joined and with the groove in the pipe nipple set around the neck portion. The mechanical pipe coupling connector is thus fastened around the grooved pipe nipple and the grooved-ended pipe to be joined, such that the grooved-end of the pipe to be joined is disposed inside the inside shoulder of the cylindrical gasket portion, and the gasket portion is thus disposed within an interior gasket receiving portion of the connector.

In preferred embodiments, the cylindrical gasket portion of the grooved-ended resilient expansion joint also has a second inside shoulder disposed axially inwardly from the other inside shoulder that is sized to receive the grooved pipe nipple. The grooved pipe nipple is thus disposed inside the second inside shoulder of the cylindrical gasket portion.

The grooved-ended resilient expansion joint may also desirably have a pair of grooved double ended pipe nipples mechanically coupled into the expansion joint. The cylindrical gasket portion may optionally be formed into a trapezoid shape to fit the interior gasket receiving portion of the connector. The resilient expansion member may optionally have a plurality of central portions, and at least one of the central portions is optionally roughly spherical.

An alternate resilient pipe expansion joint is disclosed that has a pair of grooved ended pipes, the pipes are joined together by a grooved-ended resilient expansion joint and a pair of mechanical pipe couplings.

A method of resiliently joining together a pair of grooved ended pipes is disclosed. The method has the following steps:

a. rolling a groove in a pipe end of a pipe to be joined;

b. disposing a grooved pipe nipple around a neck portion of a resilient expansion member, where the pipe nipple and the pipe to be joined have the same outer diameter and groove configuration;

c. fastening a mechanical pipe coupling connector around the grooved pipe nipple and the grooved-ended pipe to be joined.

The method may also optionally include, in the resilient expansion member, axially outward from the neck portion, a resilient cylindrical gasket portion that has an inside shoulder, and the grooved-end of the pipe to be joined is then disposed inside the inside shoulder of the cylindrical gasket portion.

BEST MODE

Figure 1:
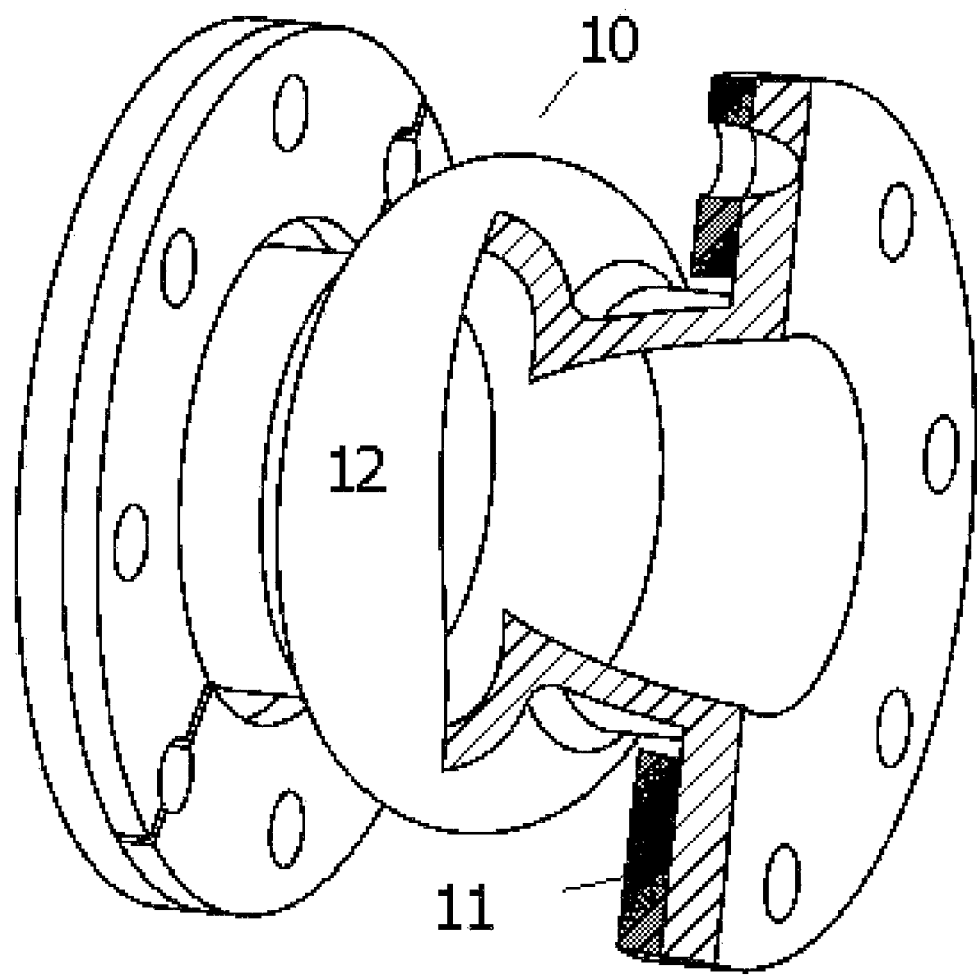
FIG. 1 is a perspective partial sectional view of a rubber expansion joint formed of rubber bellows with rubber flanges.

FIG. 1 illustrates a conventional rubber expansion joint 10 which includes rubber bellows 12 and a pair of steel flange reinforcements 11.

Figure 2:
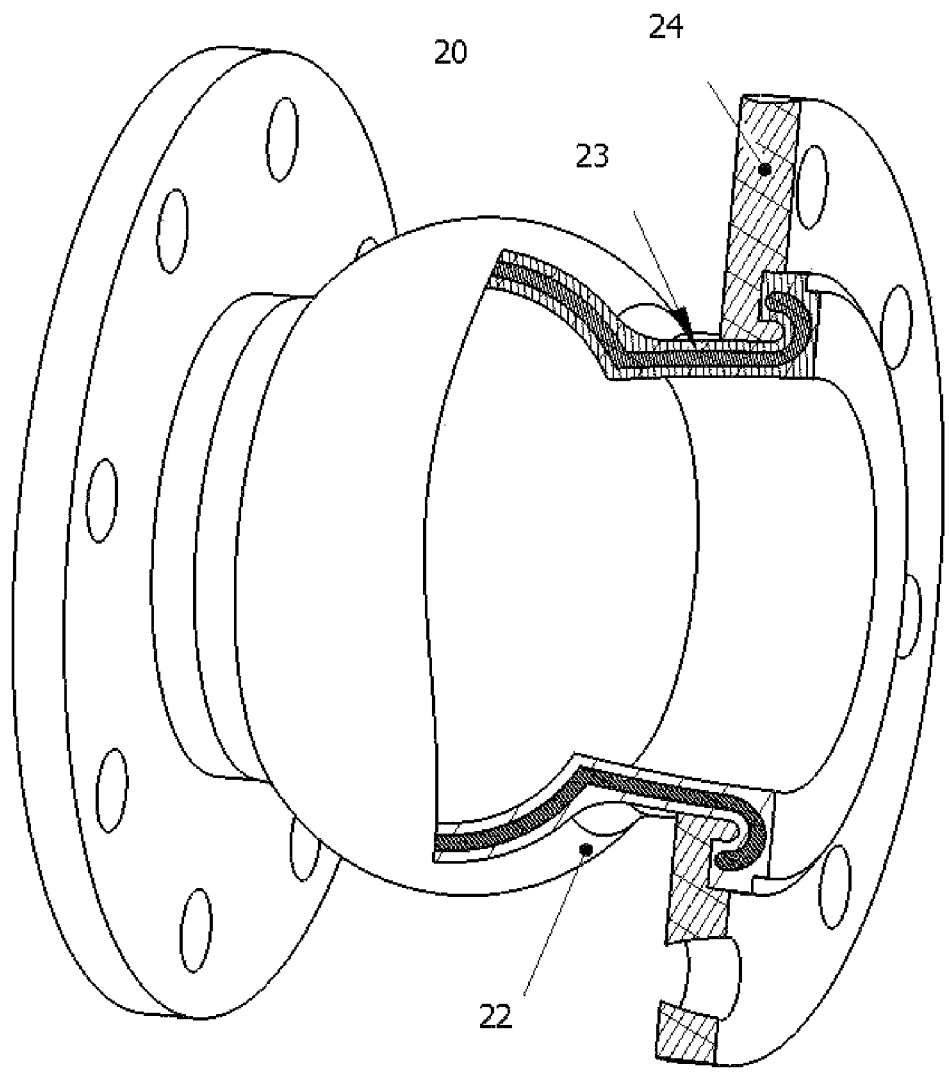
FIG. 2 is a perspective partial sectional view of a bellows reinforced with layers of nylon fabrics or steel braiding.

FIG. 2 illustrates conventional rubber expansion joint 20 with conventional bellows rubber 22 reinforced with layers of nylon fabric or steel braiding 23, and a steel flange 24.

Figure 3:
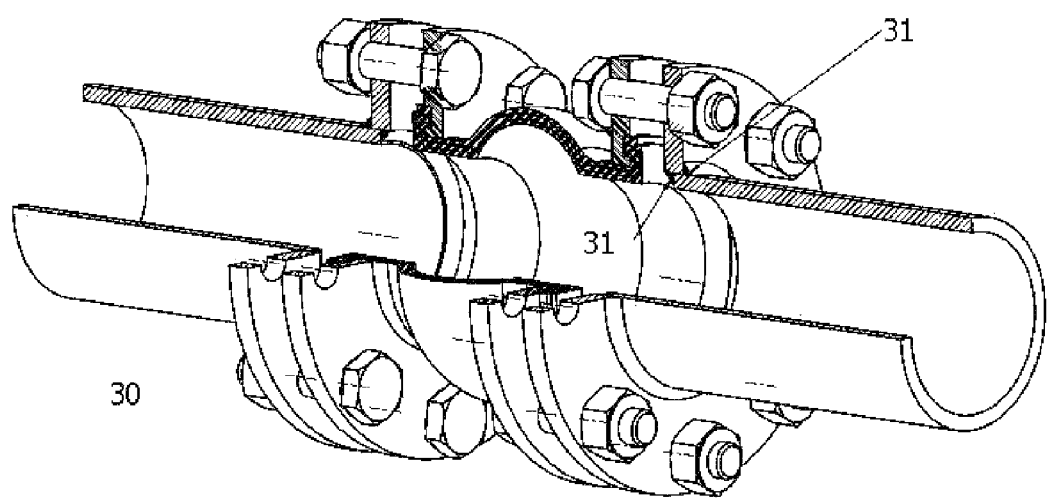
FIG. 3 is a perspective partial sectional view of a flange installation requiring welding.

FIG. 3 illustrates the necessity of high temperature welding 31 to install a flange on a conventional pipe end.

Figure 4:
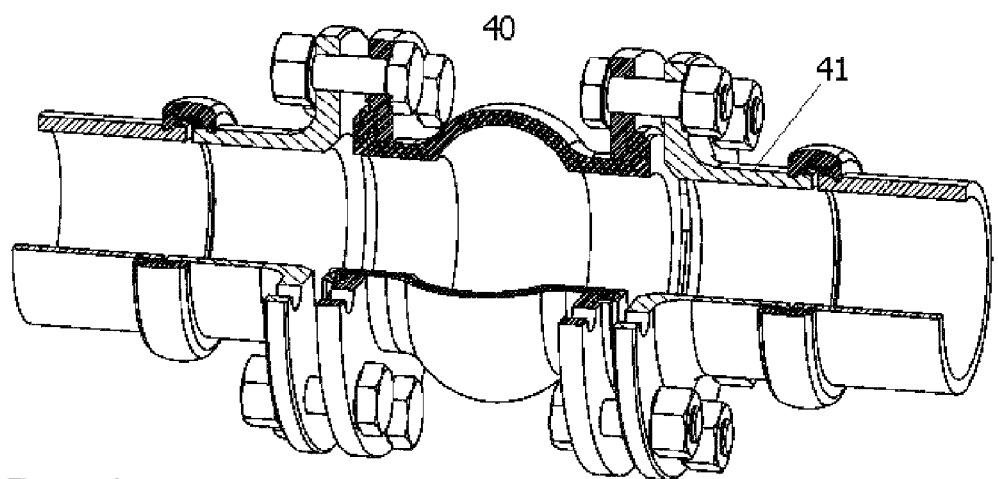
FIG. 4 is a perspective partial sectional view of a flange installation with special adapters.

FIG. 4 illustrates the use of special adapters 41 to install a flanged rubber expansion joint in a grooved piping system.

Figure 5:
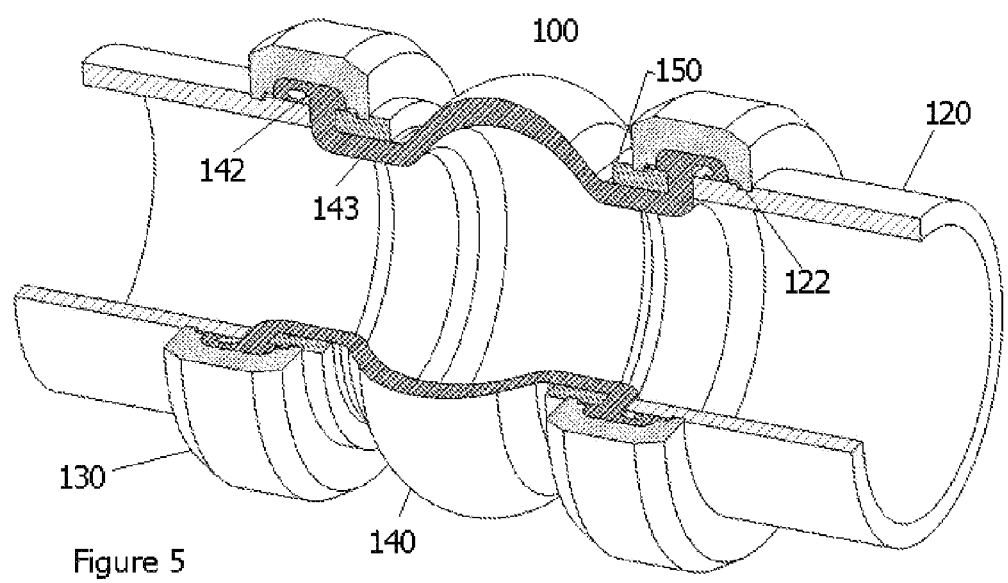
FIG. 5 is a perspective partial sectional view of a disclosed rubber expansion joint.

In FIG. 5, rubber expansion joint 100 has rubber bellows 140 and grooved pipe nipple 150. The axial outer ends of joint 100 have a neck portion 143 and a seal portion 142, desirably in roughly trapezoidal form. Pipe nipple 150 is seated on neck portion 143. Seal portion 142 engages pipe 120 and all is connected firmly with couplings 130.

I claim:

1. A grooved-ended resilient expansion joint comprising:
a resilient expansion member having a central resilient portion and two resilient axially disposed cylindrical ends; each end having a radially outwardly raised distal cylindrical gasket portion with at least one inside shoulder having an inner diameter sized substantially the same as an outer diameter of a pipe to be joined; each end having a neck portion between the central resilient portion and the radially outwardly raised distal cylindrical gasket portion and sized to receive a grooved-ended pipe nipple;
the grooved pipe nipple set around the neck portion, the grooved pipe nipple having the same outer diameter as the pipe to be joined, and grooved to mate with a selected mechanical pipe coupling connector; and
a mechanical pipe coupling connector having axially inward projecting lands that mate with the end groove in the pipe to be joined and with the groove in the pipe nipple set around the neck portion;
wherein the mechanical pipe coupling connector is fastened around the grooved pipe nipple and the end groove in the pipe to be joined, the end groove in the pipe to be joined is disposed inside the inside shoulder of the cylindrical gasket portion, and the cylindrical gasket portion is thus disposed within an interior gasket receiving portion of the connector.

2. The grooved-ended resilient expansion joint of claim 1, the cylindrical gasket portion further comprising a second inside shoulder, the second inside shoulder sized to receive the grooved pipe nipple;
wherein the grooved nipple is disposed inside the second inside shoulder of the cylindrical gasket portion.

3. The grooved-ended resilient expansion joint of claim 1, further comprising a pair of grooved double ended pipe nipples mechanically coupled into the groove-ended resilient expansion joint.

4. The grooved-ended resilient expansion joint of claim 1, wherein the cylindrical gasket portion is formed into a trapezoid shape to fit the interior gasket receiving portion of the connector.

5. The grooved-ended resilient expansion joint of claim 1, the resilient expansion member further comprising a plurality of central portions.

6. The grooved-ended resilient expansion joint of claim 5, wherein at least one of the plurality of central portions is roughly spherical.

7. A method of resiliently joining together a pair of grooved ended pipes, the method comprising the following steps:
providing first and second grooved-ended pipes, each of the first and second groove ended pipes having a pipe end, the pipe end having a groove formed thereon;
providing an expansion joint comprising a resilient expansion member having a central resilient portion and two resilient axially disposed cylindrical ends; each end having a radially outwardly raised distal cylindrical gasket portion with at least one inside shoulder having an inner diameter sized substantially the same as an outer diameter of an associated one of said first and second grooved ended pipes; each end having a neck portion between the central resilient portion and the radially outwardly raised distal cylindrical gasket portion and sized to receive a grooved pipe nipple;
disposing a first grooved pipe nipple around a first neck portion of a resilient expansion member, where the first grooved pipe nipple and the first grooved-ended pipe have the same outer diameter and groove configuration;
placing first and second mechanical pipe coupling connectors on the first and second grooved pipe nipple and the grooved ends of the first and second grooved-ended pipes;
fastening the first mechanical pipe coupling connector around the first grooved pipe nipple and the first grooved-ended pipe; and
fastening the second mechanical pipe coupling connector around the second grooved pipe nipple and the second grooved-ended pipe.

8. The method of claim 7, further comprising:
in the resilient expansion member, axially outward from the neck portion, a first resilient cylindrical gasket portion having a first inside shoulder, and
in the resilient expansion member, axially outward from the neck portion, a second resilient cylindrical gasket portion having a second inside shoulder; and
disposing the grooved-end of the first grooved-ended pipe inside the first inside shoulder of the cylindrical gasket portion; and disposing the grooved-end of the second grooved-ended pipe inside the second shoulder of the cylindrical gasket portion.

* * * * *